(12) United States Patent
Pönitz

(10) Patent No.: US 11,719,286 B2
(45) Date of Patent: Aug. 8, 2023

(54) CLUTCH DEVICE

(71) Applicant: Voith Patent GmbH, Heidenheim (DE)

(72) Inventor: Jonny Pönitz, Burkhardtsdorf (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 17/844,347

(22) Filed: Jun. 20, 2022

(65) Prior Publication Data

US 2022/0389973 A1 Dec. 8, 2022

Related U.S. Application Data

(63) Continuation of application No. PCT/EP2020/085687, filed on Dec. 11, 2020.

(30) Foreign Application Priority Data

Dec. 20, 2019 (DE) .................. 10 2019 135 350.5

(51) Int. Cl.
  *F16D 13/36* (2006.01)
  *F16D 13/66* (2006.01)
  *F16D 13/75* (2006.01)

(52) U.S. Cl.
  CPC ........... *F16D 13/36* (2013.01); *F16D 13/66* (2013.01); *F16D 13/75* (2013.01)

(58) Field of Classification Search
  CPC .......... F16D 13/30; F16D 13/36; F16D 13/66; F16D 13/75
  See application file for complete search history.

(56) References Cited

U.S. PATENT DOCUMENTS 2,437,737 A * 3/1948 Halby .................. F16D 13/75
                                                         192/111.1
3,001,623 A   9/1961 Fawick
                (Continued)

FOREIGN PATENT DOCUMENTS

DE   10 2013 008 071 A1   11/2014
DE   10 2017 114 325 A1   1/2018

OTHER PUBLICATIONS

Notification of the Transmission of the International Search Report and Written Opinion of the International Search Authority or Declaration dated Mar. 9, 2021 for International Application No. PCT/EP2020/085687 (13 pages).

*Primary Examiner* — Huan Le
(74) *Attorney, Agent, or Firm* — Taylor IP, P.C.

(57) ABSTRACT

A clutch device with friction linings includes: a clutch housing, the friction linings including a first friction lining and a second friction lining, the first friction lining being arranged on the clutch housing, the clutch housing including a stop surface; a tapered ring, the second friction lining being arranged on the tapered ring, the plurality of friction linings being arranged relative to one another so that the plurality of friction linings can be brought into full contact with one another in a contact plane, the tapered ring including a reference surface; a spring element; a clutch actuating device, a wear gap being formed between the stop surface and the reference surface, the wear gap configured for becoming wider as the friction linings wear; and a locking element configured for being moved into the wear gap when the wear gap exceeds a definable maximum width.

10 Claims, 3 Drawing Sheets

(56) References Cited

U.S. PATENT DOCUMENTS

| | | | |
|---|---|---|---|
| 4,285,420 A * | 8/1981 | Sekella | F16D 65/56 192/111.1 |
| 4,830,161 A * | 5/1989 | Hall | F16D 25/082 192/205 |
| 10,883,550 B2 * | 1/2021 | Dempfle | F16D 23/04 |
| 2005/0000775 A1 | 1/2005 | Drussel et al. | |
| 2018/0216685 A1 | 8/2018 | Xie | |

\* cited by examiner

CLUTCH DEVICE

CROSS REFERENCE TO RELATED APPLICATIONS

This is a continuation of PCT Application No. PCT/EP2020/085687, entitled "CLUTCH DEVICE", filed Dec. 11, 2020, which is incorporated herein by reference. PCT Application No. PCT/EP2020/085687 claims priority to German Patent Application No. 10 2019 135 350.5, filed Dec. 20, 2019, which is incorporated herein by reference.

BACKGROUND OF THE INVENTION

1. Field of the Invention

The present invention relates to a clutch device with friction linings, in particular for engaging ancillary components in motor vehicles, with an operating position and an idle position.

2. Description of the Related Art

Modern motor vehicles can no longer function without ancillary components for the implementation of secondary functions. A component of this type may for example be a compressor or a retarder which is switched on when required via a switchable clutch. When the clutch is open, the ancillary components are switched off, so that the energy consumption of the vehicle is reduced.

Power transmission in switchable clutches occurs normally via friction linings, which are only designed for a certain number of switch cycles. Particularly in the case of safety-relevant ancillary components, such as the air compressor in motor vehicles, which provides the compressed air for the operating brake system, a clutch connected between the drive and the component must not fail.

Such clutches must be equipped with a so-called fail-safe system which ensures that at least emergency operation is guaranteed. In the non-activated state, the fail-safe system ensures that the clutch is in the closed position and is only moved to the open position when activated. This ensures that in the event of a malfunction in the actuation control system, the clutch remains closed, and the function of the ancillary component is still guaranteed.

However, such a fail-safe system is not suitable for detecting wear on the linings, so that, in extreme cases the clutch may fail, if the wear of the linings is too far advanced, so that the clutch can no longer transmit the required torque.

From DE10 2017 114 325 A1 a conically designed friction clutch is known, that is closed by way of a spring element in the rest state and opened by way of the actuating element.

From DE 10 2013 008 071 A1 a clutch is moreover known which is equipped with a locking element by means of which the actuating element of the clutch is locked.

What is needed in the art is a fail-safe system for a clutch which ensures an emergency operating function.

SUMMARY OF THE INVENTION

The present invention provides a clutch device with friction linings, in particular for switching of ancillary components in motor vehicles. This clutch device includes a clutch housing, mounted for rotation about a shaft, on which a first friction lining is arranged, and a tapered ring mounted for rotation about the shaft, on which a second friction lining is arranged, wherein the friction linings are arranged relative to one another, so that they can be brought into full contact with one another in a contact plane. The clutch device further includes a spring element, by way of which the tapered ring can be moved along the shaft into an engaged position in which the friction linings are in contact with one another in the contact plane and are held in the engaged position; and a clutch actuating device for displacing the tapered ring against the spring force of the spring element into a disengaged position in which the friction linings are not in contact with each other.

According to the invention, a stop surface is provided on the clutch housing and a reference surface is provided on the tapered ring, a wear gap being formed between the stop surface and the reference surface, which widens as the friction linings wear, wherein the clutch device includes a locking element which can be moved into the wear gap when the latter exceeds a definable maximum width. Once the locking element has moved into the wear gap, movement of the tapered ring is prevented, and the clutch is held in the closed position so that the function of the auxiliary component is ensured.

In one optional element, the locking element can be arranged between the tapered ring and the clutch housing. Whereby furthermore, optionally distributed over the circumference of the tapered ring, several locking elements can be provided.

Each locking element can moreover include a ball, with the ball being assigned a ball chamber in the tapered ring. The ball chamber is optionally large enough that the ball can move freely in it.

Furthermore, a contact surface can be provided on the clutch housing and a contact surface on the tapered ring, with the wear gap being arranged between the contact surfaces.

The ball chamber in the tapered ring optionally has an opening which is designed in such a way that, when the clutch device rotates, the ball is pressed against the contact surfaces by the occurring centrifugal forces and the ball enters the wear gap if the ball diameter is smaller than the width of the wear gap.

In another optional embodiment, the reference surface has a first region in which the reference surface progresses parallel to the stop surface and a second region in which the reference surface progresses at an angle to the stop surface. The first region is arranged radially outside the ball chamber and the second region is arranged to the left and/or right of the first region and the ball chamber, as viewed in the axial direction.

The first region of the reference surface thus adjoins the second region so that when the clutch housing rotates relative to the tapered ring in the wear gap, the ball is moved from the first region towards the second region, where it is clamped between the reference surface and the stop surface in the wear gap.

The second region can further be designed in such a way that, during a relative torsion of the clutch housing with respect to the tapered ring, the wear gap is increased by the ball so that a force supporting the spring force of the spring elements acts on the friction linings so that they are pressed against each other in the contact plane. This ensures that the worn friction linings are always pressed against each other with a sufficient force so that relative movement of the friction linings, slippage, is avoided. This is also particularly important because the spring force decreases with increasing wear because the spring deflection increases.

The ancillary component may for example be a compressor or a retarder.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION OF THE INVENTION

Figure 1:
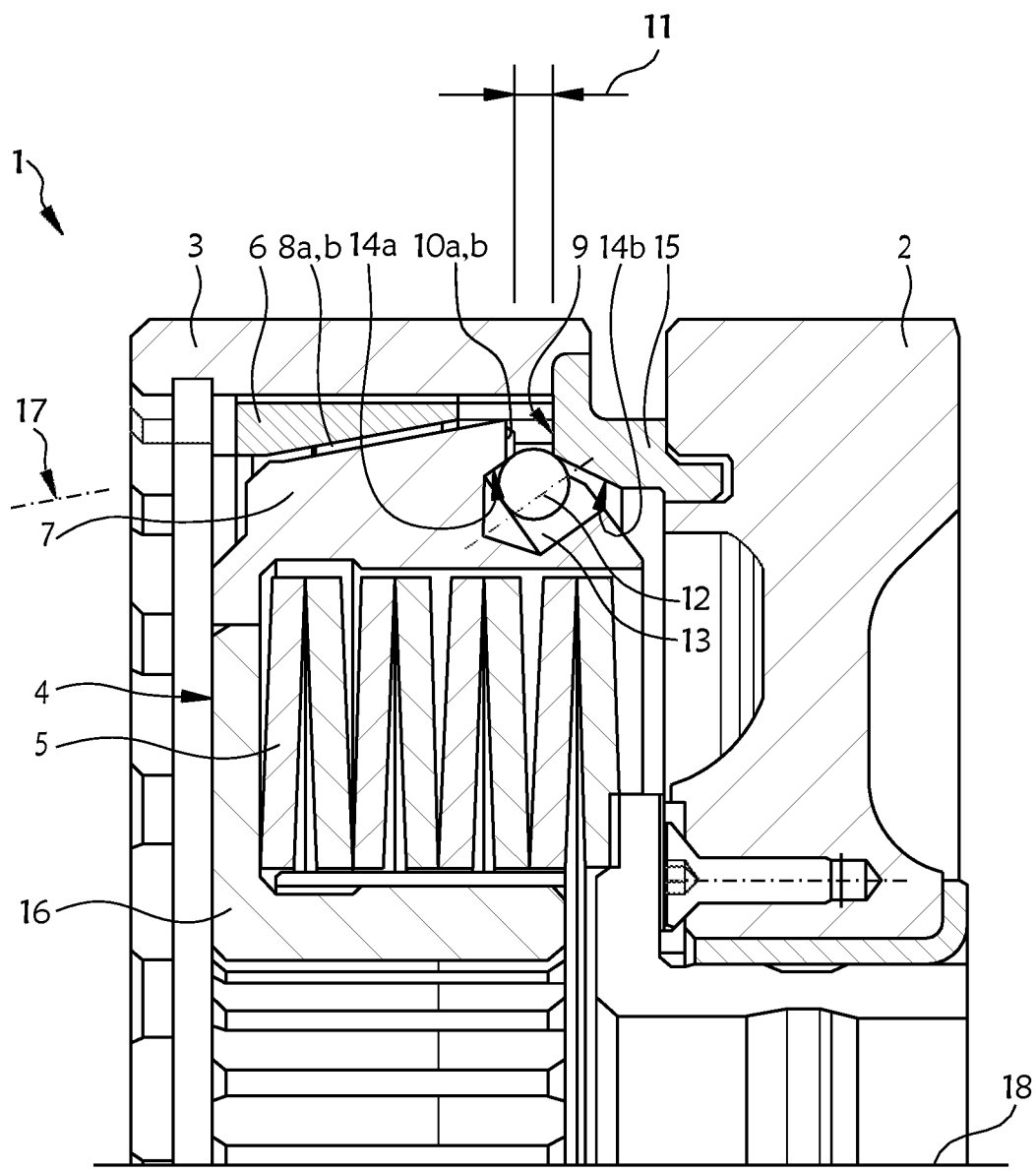
FIG. 1 is a clutch device in engaged state with non-worn friction linings.

FIG. 1 shows the structure of clutch device 1 according to the present invention, in engaged state with non-worn friction linings 8a, b. Clutch 1 consists of two assemblies mounted rotatably about axis 18. The first assembly is the primary side of the clutch, or the drive assembly, which includes drive gear 2 on hub 20, clutch housing cover 15, clutch housing 3 and clutch outer ring 6 with friction lining 8a.

The second assembly is the secondary side of the clutch or also the output assembly, which includes tapered ring 7 with friction lining 8b and tapered ring support 16.

In the sense of the invention, the components of the primary side are grouped under the term clutch housing 3 and the components of the secondary side are grouped under the term tapered ring 7.

Clutch device 1 shown here is designed in such a way that several locking devices are provided, each with a ball 12 evenly distributed around the circumference. In the state shown, clutch device 1 is in the closed position in which friction linings 8a, b are in contact with each other in contact plane 17. The contact force with which friction linings 8a, b are pressed against one another is determined by the spring force of spring element 5, wherein spring element 5 consists of a plurality of disc springs which are arranged essentially in the output assembly, tapered ring 7 and tapered ring support 16, and are supported with respect to the drive assembly, in this case on hub 20.

Clutch housing 3 or respectively the drive assembly is fixed on a drive shaft, not shown here, which is rotatably mounted about axis 18. By way of a clutch actuating device 4, which is shown here only symbolically as an arrow, the output assembly can be displaced along axis 18, on an output shaft which is not shown here, against the spring force.

In the closed position of clutch device 1, ball 12 is located in ball chamber 13 of tapered ring 7, which has an opening 19 in radial direction through which ball 12 can exit ball chamber 13. When clutch device 1 is rotated, ball 12 is pressed against contact surfaces 14a, b on tapered ring 7 and on clutch housing cover 15 by the centrifugal force, as shown. The V-shaped arrangement of contact surfaces 14a, b relative to one another causes ball 12 to be centered relative to wear gap 11.

Wear gap 11 is a gap, formed between stop surface 9 on clutch housing cover 15 and reference surface 10a, b on tapered ring 7. Wear gap 11 changes its width with increasing wear of friction linings 8a, b. The ball remains essentially in the shown position, until the wear reaches a level where the width of wear gap 11 is of a size that corresponds with the ball diameter.

Figure 2:
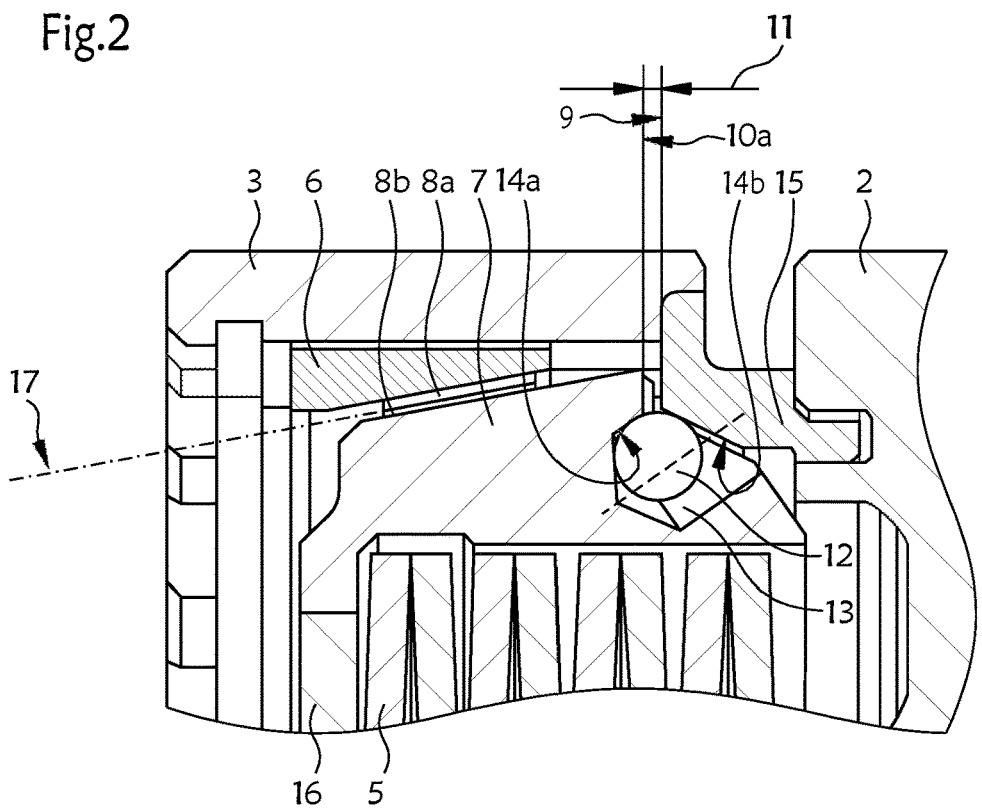
FIG. 2 is the clutch device in disengaged state with non-worn friction linings.

FIG. 2 shows clutch device 1 in disengaged state with non-worn friction linings 8a, b. Even though this is not clearly visible in the sketch, friction linings 8a, b are not in contact with each other. Wear gap 11 has been reduced by the displacement path or disengagement path, so that ball 12 is pressed further into ball chamber 13 via contact surfaces 14a, b.

Figure 3:
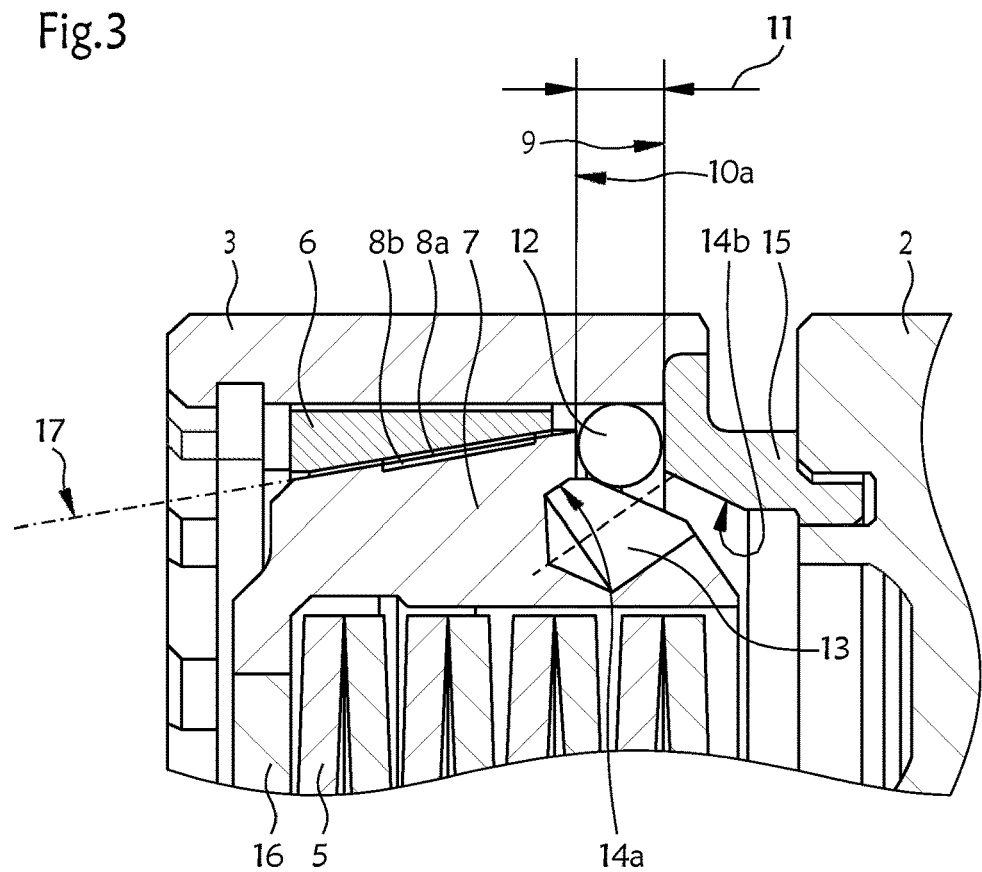
FIG. 3 is the clutch device in locked state.

FIG. 3 shows clutch device 1 in the engaged state, wherein friction linings 8a, b are worn so that wear gap 11 has a width sufficient for ball 12 to move into wear gap 11 due to the centrifugal forces. In this position, ball 12 prevents clutch device 1 from disengaging again so that a permanent drive connection is formed.

Figure 4:
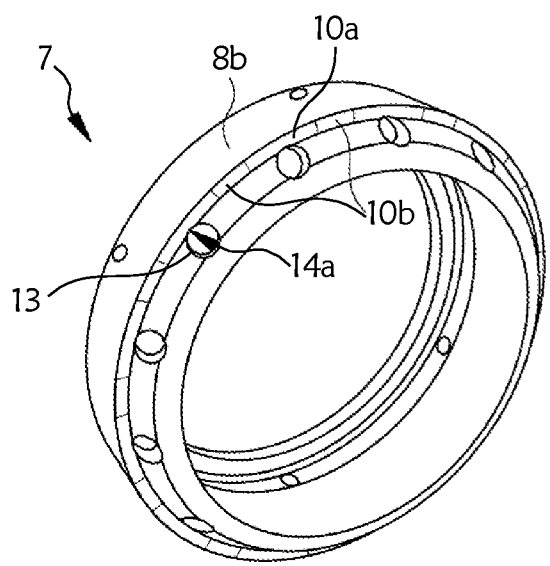
FIG. 4 is a tapered ring of clutch.
Figure 5:
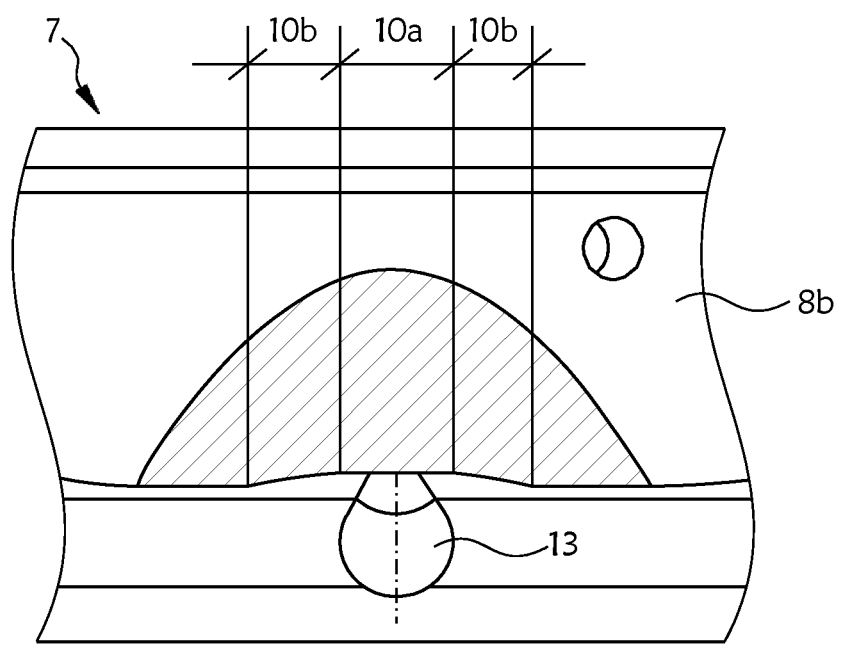
FIG. 5 is a partial section to represent reference surface on tapered ring.

FIG. 4 is a perspective view of tapered ring 7, and FIG. 5 shows a partial section of the illustration of reference surface 10a, b on tapered ring 7. It can be seen that reference surface 10a, b has a first region 10a and a second region 10b.

With respect to stop surface 9 not illustrated here, the reference surface in first region 10a is arranged parallel to stop surface 9 and reference surfaces 10b in the second region are arranged at an angle relative to stop surface 9. First region 10a is further arranged radially outside ball chamber 13 and second region 10b is arranged to the left and/or right of first region 10a and ball chamber 13, viewed in axial direction.

Second region 10b or respectively the angular arrangement is designed in such a way that, during a relative torsion of clutch housing 3 with respect to tapered ring 7, wear gap 11 is increased by ball 12 so that a force supporting the spring force of spring elements 5 acts on friction linings 8a, b so that they are pressed against each other in contact plane 17.

COMPONENT IDENTIFICATION LISTING

1 Clutch device
2 drive gear
3 clutch housing
4 clutch actuation device
5 spring elements
6 clutch outer ring
7 tapered ring
8a, b friction linings
9 stop surface
10a, b reference surface
11 wear gap
12 ball
13 ball chamber
14a, b contact surfaces
15 clutch housing cover
16 tapered ring support
17 contact plane
18 axis
19 opening
20 hub While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. Clutch device with a plurality of friction linings, the clutch device comprising:
    a clutch housing configured for being mounted for rotation about a shaft, the plurality of friction linings including a first friction lining and a second friction lining, the first friction lining being arranged on the clutch housing, the clutch housing including a stop surface;
    a tapered ring configured for being mounted for rotation about the shaft, the second friction lining being arranged on the tapered ring, the plurality of friction linings being arranged relative to one another so that the plurality of friction linings can be brought into full contact with one another in a contact plane, the tapered ring including a reference surface;
    a spring element, by way of which the tapered ring is configured for being moved along the shaft into an engaged position in which the plurality of friction linings are in contact with one another in the contact plane and are held in the engaged position;
    a clutch actuating device configured for displacing the tapered ring against a spring force of the spring element into a disengaged position in which the plurality of friction linings are not in contact with each other, a wear gap being formed between the stop surface and the reference surface, the wear gap configured for becoming wider as the plurality of friction linings wear; and
    a locking element configured for being moved into the wear gap when the wear gap exceeds a definable maximum width.

2. The clutch device according to claim 1, wherein the locking element is arranged between the tapered ring and the clutch housing.

3. The clutch device according to claim 1, further comprising a plurality of the locking element, the tapered ring including a circumference, the plurality of the locking element being distributed over the circumference of the tapered ring.

4. The clutch device according to claim 3, wherein each respective one of the plurality of the locking element comprises a ball, the tapered ring including a plurality of ball chambers, wherein each ball is assigned a respective one of the plurality of ball chambers in the tapered ring.

5. The clutch device according to claim 1, wherein the clutch housing includes a first contact surface, the tapered ring including a second contact surface, the wear gap being arranged between the first contact surface and the second contact surface.

6. The clutch device according to claim 5, wherein the locking element includes a ball, the tapered ring including a ball chamber which has an opening which is configured such that, when the clutch device rotates, the ball is pressed against the first contact surface and the second contact surface by occurring ones of a plurality of centrifugal forces and the ball enters the wear gap if a diameter of the ball is smaller than a width of the wear gap.

7. The clutch device according to claim 1, wherein the reference surface has a first region in which the reference surface progresses parallel to the stop surface and a second region in which the reference surface progresses at an angle relative to the stop surface.

8. The clutch device according to claim 7, wherein the tapered ring includes a ball chamber, the first region being arranged radially outside the ball chamber and the second region being arranged at least one of left and right of the first region and the ball chamber, as viewed in an axial direction.

9. The clutch device according to claim 7, wherein the locking element includes a ball, wherein the second region is configured such that, during a relative torsion of the clutch housing with respect to the tapered ring, the wear gap is increased by the ball so that a force supporting the spring force of the spring element acts on the plurality of friction linings so that the plurality of friction linings are pressed against each other in the contact plane.

10. The clutch device according to claim 1, wherein the clutch device is configured for switching of at least one ancillary component in a motor vehicle, wherein the at least one ancillary component is a compressor or a retarder.

* * * * *